United States Patent
Shafer et al.

(10) Patent No.: US 6,823,287 B2
(45) Date of Patent: Nov. 23, 2004

(54) METHOD FOR PREDICTING THE QUALITY OF A PRODUCT

(75) Inventors: Scott Shafer, Morton, IL (US); Alan Stockner, Metamora, IL (US); Ye Tian, Bloomington, IL (US)

(73) Assignee: Caterpillar Inc, Peoria, IL (US)

(*) Notice: Subject to any disclaimer, the term of this patent is extended or adjusted under 35 U.S.C. 154(b) by 66 days.

(21) Appl. No.: 10/320,802

(22) Filed: Dec. 17, 2002

(65) Prior Publication Data

US 2004/0117152 A1 Jun. 17, 2004

(51) Int. Cl.⁷ .............................................. G06F 19/00
(52) U.S. Cl. ........................ 702/183; 702/84; 700/109
(58) Field of Search ............................. 702/81, 82, 83, 702/84, 182, 183; 700/75, 108, 109, 110

(56) References Cited

U.S. PATENT DOCUMENTS

| | | | |
|---|---|---|---|
| 5,245,554 A | | 9/1993 | Tsuyama et al. |
| 5,452,218 A | | 9/1995 | Tucker et al. |
| 5,761,093 A | * | 6/1998 | Urbish et al. ............... 700/107 |
| 6,058,368 A | | 5/2000 | Aourane |
| 6,148,268 A | * | 11/2000 | Wu et al. ..................... 702/84 |
| 6,253,115 B1 | * | 6/2001 | Martin et al. ................. 700/97 |
| 6,336,078 B1 | | 1/2002 | Sakayori et al. |
| 6,453,209 B1 | * | 9/2002 | Hill et al. ..................... 700/95 |
| 6,526,326 B2 | * | 2/2003 | Suzuki et al. ............... 700/117 |
| 6,594,599 B1 | * | 7/2003 | Kent et al. .................... 702/84 |
| 6,604,012 B1 | * | 8/2003 | Cho et al. ................... 700/121 |
| 6,625,511 B1 | * | 9/2003 | Suzuki et al. ............... 700/110 |
| 6,650,955 B1 | * | 11/2003 | Sonderman et al. ........ 700/108 |
| 6,675,129 B1 | * | 1/2004 | Cambon et al. ............ 702/182 |
| 2002/0082738 A1 | * | 6/2002 | Goldman et al. ........... 700/109 |
| 2002/0091498 A1 | * | 7/2002 | Brunner et al. ............. 702/182 |
| 2002/0174384 A1 | * | 11/2002 | Graichen et al. ............. 714/37 |

OTHER PUBLICATIONS

Hayes et al., "A Manufacturing Process Planner for a Concurrent Engineering Environment", IEEE, 1995.*

* cited by examiner

*Primary Examiner*—Patrick J. Assouad
(74) *Attorney, Agent, or Firm*—Finnegan, Henderson, Farabow, Garrett & Dunner

(57) ABSTRACT

A method is provided for predicting a quality characteristic of a product to be manufactured. The method may integrate one or more of feature and tolerance information associated with the product, manufacturing characteristic information associated with the manufacture of the product, measurement capability characteristic information associated with the manufacture of the product, assembly characteristic information associated with an assembly of the product, and desired quality characteristic information associated with the product. Based on the integrated information, the quality characteristic of the product may be predicted.

21 Claims, 10 Drawing Sheets

| STATISTIC INFORMATION OF INJECTOR PRODUCTION | | | | DELIVERY GAIN FACTORS | | | TIMING GAIN FACTORS | | |
|---|---|---|---|---|---|---|---|---|---|
| PART NAME | UNIT | MEAN | U-BOUND +3 SIGMA | L-BOUND 3 SIGMA | UNIT | RATED | IDLE | UNIT | RATED | IDLE |
| SOLENOID FORCE | N | 98.000 | 3.0075 | 3.0075 | mm3/N | 0.600 | 0.050 | msec/N | -0.007 | 0.006 |
| SPOOL SPRING PRELOAD | N | 50.000 | 2.2556 | 2.2556 | mm3/N | -0.030 | -0.020 | msec/N | -0.001 | -0.003 |
| SPOOL SPRING RATE | N/mm | 14.400 | 0.6496 | 0.6496 | mm3/(N/mm) | -0.033 | -0.022 | msec/mm | 0.000 | -0.003 |
| SPOOL BODY ANGLED HOLE | mm | 19.970 | 0.0752 | 0.0752 | mm3/mm | 0.000 | 0.000 | msec/mm | 0.000 | 0.000 |
| RATE SHAPE HOLE DIAMETER | mm | 1.300 | 0.0226 | 0.0226 | mm3/mm | 70.000 | 27.000 | msec/mm | 0.006 | -0.290 |
| PISTON HAT ANGLE | deg | 3.600 | 0.3759 | 0.3759 | mm3/deg | -0.808 | 0.431 | msec/deg | 0.003 | -0.009 |
| PISTON HAT CLEARANCE | mm | 0.020 | 0.0075 | 0.0075 | mm3/mm | 340.000 | 180.000 | mm3/mm | 0.263 | 4.789 |
| PLUNGER SPRING PRELOAD | N | 75.000 | 1.8797 | 1.8797 | mm3/N | -0.057 | -0.010 | msec/N | 0.000 | 0.000 |
| PLUNGER SPRING RATE | N/mm | 9.700 | 0.2428 | 0.2429 | mm3/(N/mm) | -0.209 | -0.037 | msec/(N/mm) | 0.001 | 0.001 |
| DAMPING ORIFICE DIAMETER | mm | 1.000 | 0.0376 | 0.0376 | mm3/mm | -2.000 | 0.800 | msec/mm | -0.040 | -0.170 |
| PLUNGER/BARREL CLEARANCE | mm | 0.005 | 0.0015 | 0.0015 | mm3/mm | -750.000 | 240.000 | msec/mm | 0.150 | 6.100 |
| CHECK GUIDE CLEARANCE | mm | 0.006 | 0.0023 | 0.0023 | mm3/mm | -750.000 | 240.000 | msec/mm | 0.150 | 6.100 |
| CHECK PISTON CLEARANCE | mm | 0.009 | 0.0041 | 0.0041 | mm3/N | -570.000 | 140.000 | msec/N | -0.170 | -0.140 |
| ARMATURE SPRING PRELOAD | N | 45.000 | 1.6416 | 1.8418 | mm3/N | -0.642 | -0.325 | msec/N | 0.009 | 0.001 |
| ARMATURE AIR-GAP | mm | 0.242 | 0.0096 | 0.0096 | mm3/mm | -438.000 | -286.000 | msec/mm | 0.001 | 0.933 |
| SEATED PIN LIFT | mm | 0.145 | 0.0094 | 0.0094 | mm3/mm | 416.000 | 283.000 | msec/mm | 0.105 | 2.650 |
| SPOOL TRAVEL | mm | 1.100 | 0.0222 | 0.0222 | mm3/mm | 4.000 | 7.000 | msec/mm | 0.194 | -0.075 |
| VOP | MPa | 18.000 | 2.5108 | 2.5108 | mm3/MPa | -0.194 | -1.094 | msec/MPa | 0.002 | 0.067 |
| CHECK LIFT | mm | 0.275 | 0.0462 | 0.0462 | mm3/mm | 35.000 | 7.000 | msec/mm | 0.000 | 0.000 |
| NOZZLE STEADY FLOW | kg/min | 1.770 | 0.0788 | 0.0788 | mm/(kg/min) | 20.000 | 3.420 | mm/(kg/min) | 0.003 | -0.426 |

FIG. 7

| HEUI™ B FUEL SYSTEM INJECTOR FIRST TEST PASS ANALYSIS V.1.20 | | | | | | | | | | | | |
|---|---|---|---|---|---|---|---|---|---|---|---|---|
| PART 9: INJECTOR PERFORMANCE VARIANCE | | | | | | | | | | | | |
| | VARIANCE | DELIVERY (mm3) | | | | | | TIMING (msec) | | | | |
| | | RATED | | | IDLE | | | RATED | | | IDLE | |
| PARAMETERS | NOMINAL SHIFT | MEAN SHIFT | UPPER 3 SIGMA | LOWER 3 SIGMA | MEAN SHIFT | UPPER 3 SIGMA | LOWER 3 SIGMA | MEAN SHIFT | UPPER 3 SIGMA | LOWER 3 SIGMA | MEAN SHIFT | UPPER 3 SIGMA | LOWER 3 SIGMA |
| SOLENOID FORCE | 0.000 | 0.000 | 1.805 | -1.805 | 0.000 | 0.150 | -0.150 | 0.000 | -0.021 | 0.021 | 0.000 | 0.017 | -0.017 |
| SPOOL SPRING PRELOAD | 0.000 | 0.000 | -0.068 | 0.068 | 0.000 | -0.045 | 0.045 | 0.000 | -0.002 | -0.002 | 0.000 | -0.008 | 0.008 |
| SPOOL SPRING RATE | 0.000 | 0.000 | -0.021 | 0.021 | 0.000 | -0.014 | 0.014 | 0.000 | 0.000 | 0.000 | 0.000 | -0.002 | 0.002 |
| SPOOL ANGLED HOLE POSITION | 0.000 | 0.000 | 0.000 | 0.000 | 0.000 | 0.000 | 0.000 | 0.000 | 0.000 | 0.000 | 0.000 | 0.000 | 0.000 |
| RATE SHAPE HOLE DIAMETER | 0.000 | 0.000 | 1.579 | -1.579 | 0.000 | 0.609 | -0.609 | 0.000 | 0.001 | 0.000 | 0.000 | -0.007 | 0.007 |
| PISTON HAT ANGLE | 0.000 | 0.000 | -0.304 | 0.304 | 0.000 | -0.162 | 0.162 | 0.000 | 0.002 | -0.001 | 0.000 | -0.003 | 0.003 |
| PISTON HAT CLEARANCE | 0.000 | 0.000 | 2.556 | -2.556 | 0.000 | 1.353 | -1.353 | 0.000 | 0.001 | -0.002 | 0.000 | 0.036 | -0.036 |
| PLUNGER SPRING PRELOAD | 0.000 | 0.000 | -0.107 | 0.107 | 0.000 | -0.019 | 0.019 | 0.000 | 0.001 | -0.001 | 0.000 | 0.001 | -0.001 |
| PLUNGER SPRING RATE | 0.000 | 0.000 | -0.051 | 0.051 | 0.000 | -0.009 | 0.009 | 0.000 | 0.000 | 0.000 | 0.000 | 0.000 | 0.000 |
| DAMPING ORIFICE DIAMETER | 0.000 | 0.000 | -0.075 | 0.075 | 0.000 | -0.030 | 0.030 | 0.000 | -0.002 | 0.002 | 0.000 | -0.006 | 0.006 |
| PLUNGER/BARREL CLEARANCE | 0.000 | 0.000 | 1.128 | -1.128 | 0.000 | 0.361 | -0.361 | 0.000 | 0.000 | 0.000 | 0.000 | 0.009 | -0.009 |
| CHECK GUIDE CLEARANCE | 0.000 | 0.000 | 1.692 | -1.692 | 0.000 | 0.541 | -0.541 | 0.000 | 0.000 | 0.000 | 0.000 | 0.014 | -0.014 |
| CHECK PISTON CLEARANCE | 0.000 | 0.000 | 2.357 | -2.357 | 0.000 | 0.579 | -0.579 | 0.000 | 0.001 | 0.001 | 0.000 | -0.001 | 0.001 |
| ARMATURE SPRING PRELOAD | 0.000 | 0.000 | 1.182 | -1.182 | 0.000 | 2.738 | -2.738 | 0.000 | 0.017 | -0.017 | 0.000 | 0.002 | -0.002 |
| ARMATURE AIR-GAP | 0.000 | 0.000 | 4.194 | -4.194 | 0.000 | 2.674 | -2.674 | 0.000 | 0.000 | 0.000 | 0.000 | 0.009 | -0.009 |
| SEATED PIN LIFT | 0.000 | 0.000 | 3.931 | -3.931 | 0.000 | 0.156 | -0.156 | 0.000 | 0.001 | -0.001 | 0.000 | 0.025 | -0.025 |
| SPOOL TRAVEL | 0.000 | 0.000 | 0.089 | -0.089 | 0.000 | -2.747 | 2.747 | 0.000 | 0.004 | -0.004 | 0.000 | -0.002 | 0.002 |
| VOP | 0.000 | 0.000 | 0.487 | -0.487 | 0.000 | 0.324 | -0.324 | 0.000 | 0.005 | -0.005 | 0.000 | 0.168 | -0.168 |
| CHECK LIFT | 0.000 | 0.000 | 1.618 | -1.618 | 0.000 | 0.270 | -0.270 | 0.000 | 0.000 | 0.000 | 0.000 | 0.000 | 0.000 |
| NOZZLE STEADY FLOW | 0.000 | 0.000 | 1.577 | -1.577 | 0.000 | 0.270 | -0.270 | 0.000 | 0.000 | 0.000 | 0.000 | -0.034 | 0.034 |

| STATISTIC SUMMARY | 0.000 | 0.000 | 7.86633 | 7.86633 | 0.000 | 5.07626 | 5.07626 | 0.000 | 0.02818 | 0.02818 | 0.000 | 0.17936 | 0.17936 |
|---|---|---|---|---|---|---|---|---|---|---|---|---|---|
| INCLUDE BENCH REFERENCE VARIANCE | 0.000 | -2.230 | 8.14961 | 8.14961 | -2.230 | 5.09716 | 5.09716 | -0.029 | 0.03444 | 0.03444 | 0.075 | 0.17997 | 0.17997 |

FIG. 9

METHOD FOR PREDICTING THE QUALITY OF A PRODUCT

TECHNICAL FIELD

The present invention relates generally to product manufacturing and, more particularly, to a method for monitoring and analyzing the quality of a product.

BACKGROUND

Products are often manufactured based on physical and/or functional characteristics of one or more components included in the product. For example, a fuel injector must be manufactured with predetermined dimensions in order to be compatible with a host machine. Further, the fuel injector must be manufactured so that it performs in a manner required for proper operation of the machine. Also, a product may be composed of a number of components that each must meet physical and functional characteristics to ensure the product meets specified criteria. Accordingly, high quality, precise manufacturing is required to ensure a product will operate as expected and within acceptable tolerances.

To ensure a product is manufactured according to its specified criteria, manufacturers may perform quality control checks during and following a manufacturing process. For example, a manufacturer may determine the quality of one or more components that are included in a product prior to assembling them into the product. The quality determination for each component may be based on one or more parameters that affect the assembly or the function of the product. Although measuring the quality of components during an assembly operation may provide some insight on the quality of a product's components, the piece meal analysis of the individual components does not provide a reliable analysis of the product's overall quality.

To address these reliability problems, manufacturers may perform a First Test Pass (FTP) analysis that involves testing a manufactured product in a performance tester device to determine whether the physical and/or functional characteristics of a product's components are acceptable (e.g., within predetermined tolerances). Along with testing the quality of the manufacturing of a product, the FTP analysis may also provide a comprehensive test of manufacturing capability, quality control strategy, production environment, etc., since the criteria of a product (e.g., physical and functional) are being tested on the product's components as a whole. An FTP analysis produces a value called an FTP pass rate, which reflects the percentage of components tested that are acceptable. Most manufacturers aim for high FTP pass rates, such as 95%, because the pass rate directly affects profits. That is, if a product's FTP pass rate is too low, the product may have to be redesigned and/or remanufactured.

The FTP pass rate may be based on multiple factors associated with a manufacturing process such as: manufacturing capability, assembly procedure, measurement capability, sensitivity features, and FTP test criteria. Manufacturing capability reflects the ability of a manufacturer to meet predetermined design requirements, such as nominal measurements and tolerances. To minimize functional and/or physical variations in manufactured products, a manufacturer must also be able to minimize the ratio of a manufacturing range of specifications over a tolerance range of specifications, which is known as the Cpk factor. Assembly procedures also affect variation between products. For example, improper assembly procedures may increase assembly error, which in turn will lower the FTP pass rate for a corresponding product. Measurement capability reflects the ability to measure various types of characteristics of product components that are included in the assembly procedure. Errors in measurement may significantly affect the variation between product because the assembly process may be unnecessarily adjusted to compensate for incorrect measured component characteristics. Sensitivity features denote one or more features that have significant effect on the performance of a product. Finally, FTP test criteria are associated with standards for quality control based on customers requirements.

One conventional method for determining the quality of a assembly process is described in U.S. Pat. No. 5,452,218 issued on Sep. 19, 1995 to Tucker et al. The method described in the '218 patent includes collecting manufacturing capability data stored in a database to model a product to produce a measure of quality for the product. Although the method in the '218 patent provides quality information for a product, the method does not consider a combination of information such as manufacturing capability, assembly procedure, measurement capability, sensitivity features, and desired quality characteristics associated with the product. Accordingly, the measure of quality for the product are based on limited information leaving a product open to additional defect producing operations that are not accounted for by the method.

There is currently no method for analyzing and monitoring pass rates based on the relationship between the above mentioned factors. The present invention is directed to solving one or more of the problems set forth above.

SUMMARY OF THE INVENTION

A method is provided for predicting a quality characteristic of a product to be manufactured. The method may include identifying a feature and an associated tolerance associated with the product. Further the method may include determining a manufacturing characteristic associated with a manufacture of the product, determining a measurement characteristic associated with the manufacture of the product, determining an assembly characteristic associated with the assembly of the product, and determining a desired quality characteristic associated with the product. Based on the determined characteristics and identified feature and tolerance, the method may predict the quality characteristic of the product.

Further, a system is provided for predicting a quality characteristic of a product is provided. The system may comprise a memory including instructions for identifying a feature and associated tolerance associated with the product. Further, the memory may include instructions for determining a manufacturing characteristic associated with a manufacture process of the product, instructions for determining a measurement characteristic associated with the manufacture of the product, instructions for determining an assembly characteristic associated with the assembly of the product, and instructions for determining a desired quality characteristic associated with the product. Also, the memory may include instructions for predicting the quality characteristic of the product based on the determined characteristics and identified feature and associated tolerance. In addition to the memory, the system may also include a processor configured to execute each of the instructions included in the memory.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings:

FIG. 7 illustrates an exemplary table of statistical production information consistent with embodiments of the present invention;

FIG. 9 illustrates an exemplary table of performance variation information consistent with embodiments of the present invention.

DETAILED DESCRIPTION

Figure 1:
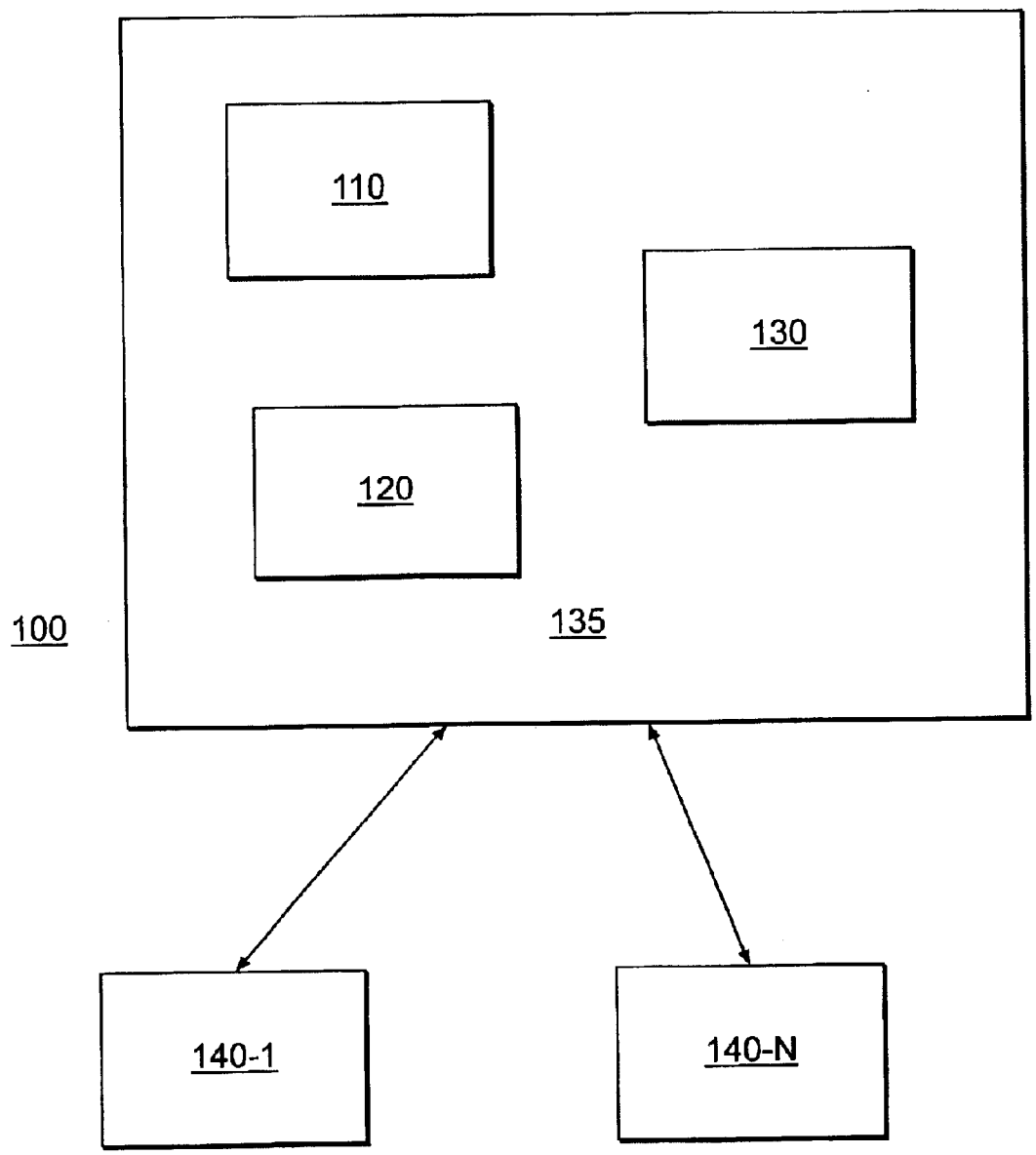
FIG. 1 illustrates an exemplary system that may be configured to perform certain functions consistent with embodiments of the present invention.

FIG. 1 illustrates an exemplary system 100 in which embodiments of the present invention may be implemented. As shown in FIG. 1, system 100 may include a plurality of modules that perform various functions. In one embodiment of the present invention, system 100 includes an analysis system 105 and external entities 140-1 to 140-N.

Analysis system 105 is a computing system that is configured to receive information from entities 140-1 to 140-N to perform analysis and prediction functions consistent with embodiments of the invention, such as FTP analysis functions. Analysis system 105 may include processor 110, memory 120, and interface device 130. Processor 110 may be one or more processor devices, such as a microprocessor, laptop computer, desktop computer, workstation, mainframe, etc. that execute program instructions to perform various functions. Memory 120 may be one or more storage devices that maintain data (e.g., instructions, software applications, etc.) used by processor 110. In one embodiment of the present invention, memory 120 includes data and software that is accessed and executed by processor 110 to analyze a quality characteristic of a product before its manufacture. A product, as used herein, may represent any type of physical good that is designed, developed, manufactured, assembled, and/or delivered by a source, such as, for example, a manufacturer. A product may be composed of one or more components that collectively form the product. Interface 130 may be one or more interface devices configured to facilitate the exchange of data between system 105 and external sources, such as entities 140-1 to 140-N.

Entities 140-1 to 140-N may be one or more sources of information that are used by system 105 to perform analysis functions. In one embodiment, entities 140-1 to 140-N are associated with one or more departments of a manufacturer of a product. For example, entity 140-1 may be associated with an engineering department that provides design and tolerance data. An entity 140-2 (not shown) may be associated with a manufacturing department that provides manufacturing characteristics, such as statistical distribution information, which may include Cpk values for the manufactured product. Further, entity 140-N may be associated with an assembly department that provides information corresponding to the assembly of the product during its manufacture.

Although FIG. 1 shows the configuration of elements 105 and 140-1 to 140-N as separate elements, one skilled in the art would realize that system 100 may be implemented in a number of different configurations without departing from the scope of the present invention. For example, system 105 and entities 140-1 to 140-N may be combined into a single module that includes software, hardware, and/or a combination of both. Alternatively, system 100 may be configured as a distributed system, with modules 105 and 140-1 to 140-N distributed in remote locations and interconnected by communication paths, such as Local Area Networks (LANs), Wide Area Networks (WANs), and any other type of network that may facilitate communications and the exchange of information between the elements in FIG. 1 and/or any other elements that may be implemented by system 100.

Figure 2:
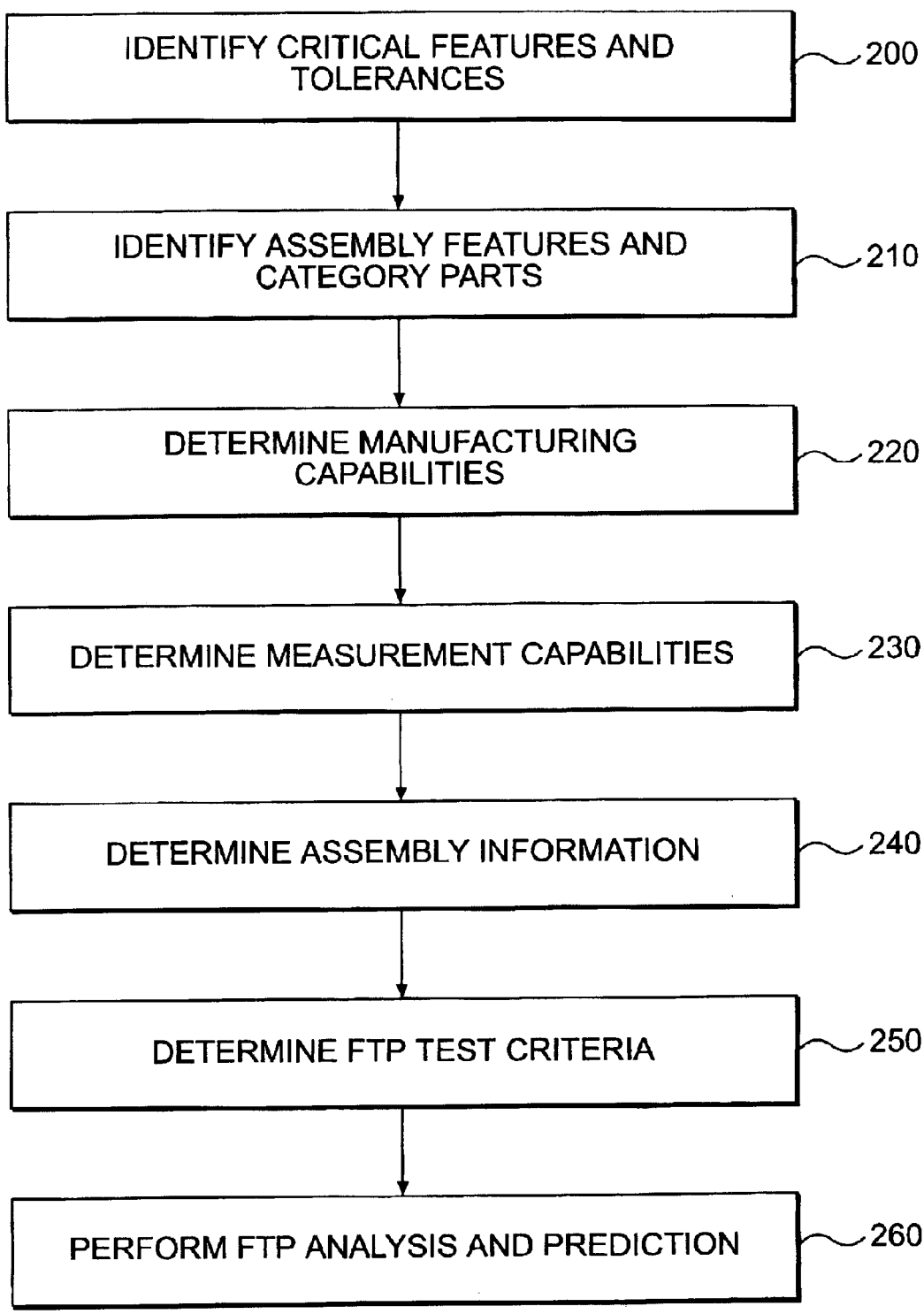
FIG. 2 illustrates a flowchart of an exemplary FTP analysis method consistent with embodiments of the present invention.

In one embodiment of the invention, exemplary system 100 may be configured to predict a quality characteristic, such as a FTP rate, for one or more products. FIG. 2 shows a flowchart of an exemplary analysis method that may be performed by system 100. Although the analysis method shown in FIG. 2 will be described with respect to one type of product (e.g., fuel injector) built by a manufacturer, one skilled in the art would appreciate that the following description may apply to any type of product.

The analysis method may begin by system 105 determining features and tolerances for certain components (e.g., parts) of the product being analyzed, such as an exemplary fuel injector (step 200). For exemplary purposes, the components associated with these features are labeled non-category parts. In one embodiment, all, or most of the features and tolerances associated with the components are identified. In an alternative embodiment, a feature may be considered to be a physical and/or functional characteristic of a component (e.g., non-category part) that significantly affects the performance of a product. Because the performance of a product is related to a number of physical and/or functional features (e.g., dimensions, spring rate, etc.), system 105 may facilitate various processes that enable the features of a product to be identified. To facilitate these processes, system 105 may retrieve product data from one or more entities 140-1 to 140-N, such as product specifications (e.g., dimensions, threshold limits, functional characteristics, etc.) and statistical data associated with these specifications.

In one embodiment, system 100 may identify features of a product by performing a sensitivity process that determines the sensitivity of the product's performance to its product specifications. System 100 may perform the sensitivity process via empirical methods or simulation methods.

For example, in an empirical analysis, a set of samples of a product are tested with varying test parameters (e.g., various dimensions, operating conditions, etc.). Simulation methods use mathematical models to simulate a product with varying test parameters. By varying the parameters in the model, system 100 may determine relationships between product specifications and performance. For example, varying the size of a nozzle in a fuel injector may adjust the performance of the simulated injector. In one embodiment, one or more entities 140-1 to 140-N may provide the results of a sensitivity process to system 105. Alternatively, system may perform the sensitivity process based on product analysis information received from one or more entities 140-1 to 140-N. Based on the results of the sensitivity analysis, system 105 may identify one or more features of a product to perform the analysis.

For example, system 105 may determine through sensitivity analysis that slight changes in the nozzle size of the exemplary fuel injector result in significant changes in performance of the injector. Accordingly, system 105 may identify nozzle size as a feature of the fuel injector to be analyzed. On the other hand, if changes in another component of the fuel injector result in small or insignificant changes in performance, system 105 may determine that the other component does not impact the quality characteristic enough to analyze it. Essentially, the sensitivity analysis determines the impact on the performance of a product when one or more components and/or functional parameters varies, even slightly, from nominal values. Sensitivity analysis determines which of these components and/or parameters contribute the most to the performance of the product. In one embodiment, features may be identified for analysis based on the sensitivity analysis.

System 105 may identify the features to analyze automatically, manually, or a combination of both, based on the results of the sensitivity analysis. For example, system 105 may provide sensitivity results to a user operating system 105. The user may identify the features to analyze of a product based on the results. The identified features may then be stored in memory 120 for use during the analysis method.

Figure 3:
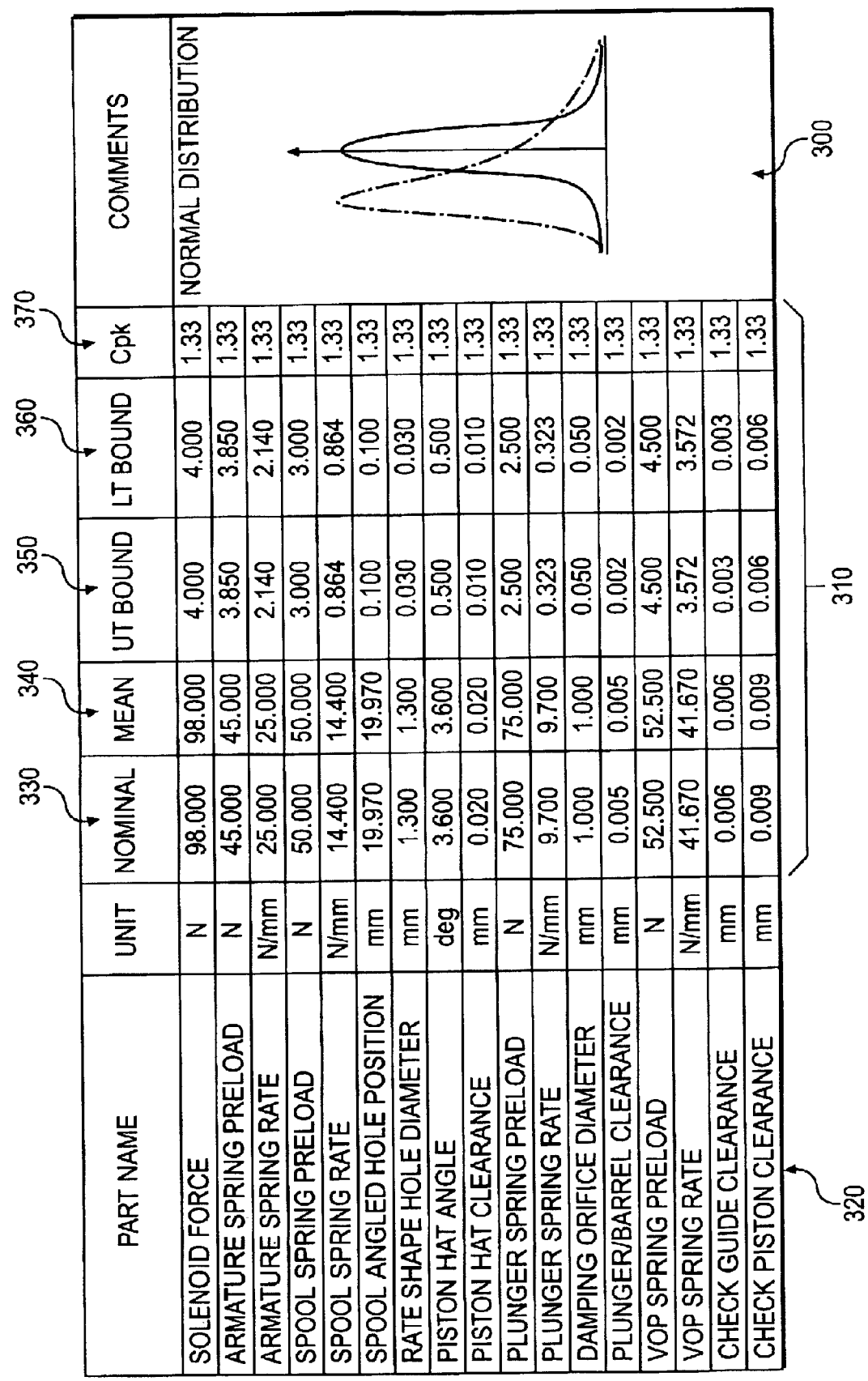
FIG. 3 illustrates an exemplary table of features consistent with embodiments of the present invention.

In another embodiment, system 105 may also identify one or more tolerances for each of the identified features. A tolerance indicates a range of values at which a variance for the feature is acceptable. For example, a tolerance range may be based on a nominal value plus or minus a tolerance bound (e.g., 50 mm+/−0.5 mm). The nominal value may be an actual measured mean value of a feature or may be a value calculated by system 105 and/or a user. Further, a tolerance may be based on a manufacturing metric, such as Cpk, where the tolerance range is expressed in standard deviations. FIG. 3 shows a table 300 listing the features 310 of a plurality of non-category parts 320 for a fuel injector. As shown, the features 310 of the exemplary injector may include a nominal value 330 reflecting a designed value determined by system 105. Mean value 340 reflects an actual measured value based on the analysis of a number of corresponding samples of the respective non-category part. Variations between the measured mean values 340 and the designed nominal values 330 reflect a variance in the actual characteristics of the corresponding non-category part. This variance may result in a shift in the mean performance of the product that includes these varying non-category parts.

Table 300 also shows for each non-category part a corresponding designed tolerance window consisting of an Upper Tolerance (UT) bound 350 and a Lower Tolerance (LT) bound 360. The designed nominal value and tolerance window may be reflected in the following relationship:

Nominal−$LT$ Bound≦Non-category part dimension≦Nominal+$UT$ bound

Cpk 370 is a value reflecting the manufacturing capability for the corresponding non-category part and may be defined by the following relationship:

$Cpk = (UTB + LTB)/6\sigma$, where $\sigma$ is the standard deviation of the non-category part dimension. Accordingly, the higher the Cpk value, the higher the capability of the process used in manufacturing the non-category part.

In addition to determining features and tolerances, system 105 may also identify assembly features and category parts (step 210). Category parts are components of a product that when assembled together provide an assembly feature. For example, following the exemplary fuel injector product example, air gap is an assembly feature because it is not an actual component that is assembled to the product. To set air gap accurately, a number of different category parts are involved, such as an armature, solenoid spacer, seated pin, upper and lower seat, and seated pin travel spacer. In one embodiment, system 105 may select a portion (e.g., one) of the category parts for an assembly feature. For example, for air gap, system 105 may select solenoid spacer as a category part. Category parts may be treated the same as features, or may be treated differently. For example, a distribution of characteristics for each category part may be assumed to be uniform, thus the standard deviation may be calculated rather than measured.

System 105 may also determine manufacturing characteristics associated with the components of the product under analysis (step 220). The manufacturing characteristics may be indicative of how well the component may be manufactured. In one embodiment, a potential manufacturer of a component (e.g., category and non-category parts) may provide input to system 105 reflecting a tolerance range for their particular component and/or how much of the tolerance range they are using. A manufacturer will typically determine a component's tolerance range by actually testing a sample set of the components. As discussed above, the Cpk factor is one designation of a manufacturer's capabilities, and may be described as the ratio of the manufacturer's range over the tolerance range. For example, a certain component may have a requirement of a diameter of 4 mm plus/minus 0.1 mm. A manufacturer may test a number of these produced components to determine actual measurements for the diameter. Any variances between the required diameter and actual measured diameter may be collected and a statistic calculated, such as a normal distribution based on the actual measurements. A higher Cpk value indicates that the manufacturer is working within a smaller range of the variance inside the permitted tolerances, i.e., the parts have less variation among themselves. In an alternative embodiment, rather than receiving data from a manufacturer based on actual tests, a Cpk or other value may be determined from a simulation performed by system 105 or another entity, such as entity 140-1.

Figure 4:
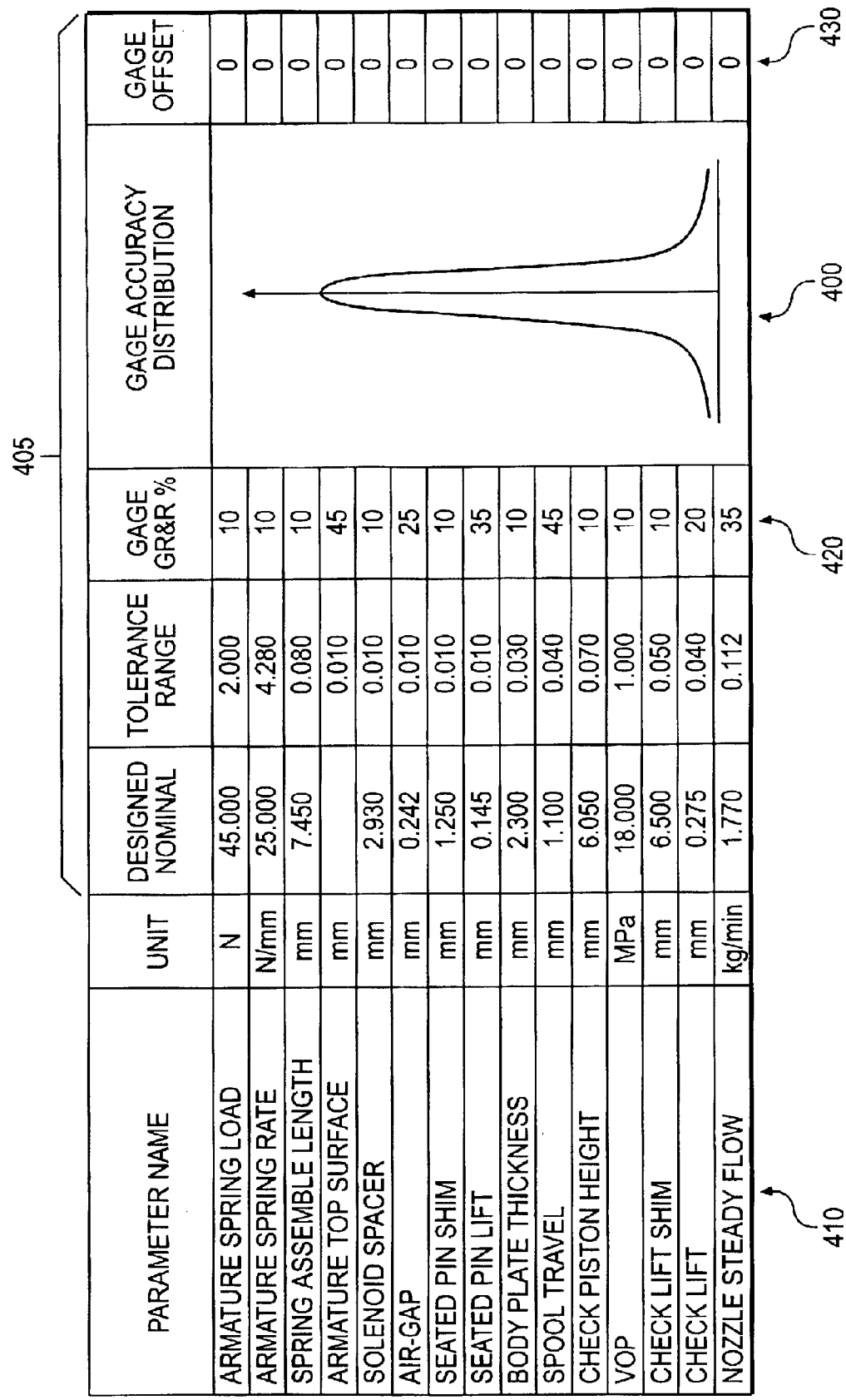
FIG. 4 illustrates an exemplary table of features and measuring capabilities consistent with embodiments of the present invention.

Many measurements may be used in the assembly process of a product to test the quality of components and the assembly process itself. Measurements may be affected not only by the type of device used to measure (e.g., gauge), but also by environmental conditions (e.g., temperature and/or humidity), calibration of the measuring device, and human error. Accordingly, system 105 is also able to determine the measurement characteristics associated with the manufacture of a product (step 230). In one embodiment, measurements may include one or more gauge characteristics. For example, gauge characteristics may include gauge repeatability and reproducibility (GR&R) and gauge offset. GR&R is the accuracy of a measurement device to produce consistent and accurate measurement values. GR&R also reflects the effect of human error and environment change on accurate measurements. Gauge offset reflects the calibration status for the measurement device for its zero reference position. FIG. 4 shows a table 400 listing a number of features used in the assembly of the exemplary fuel injector product. As shown, table 400 includes exemplary parameters 405 associated with category parts 410, including GR&R percentage values 420 and gauge offset values 430.

Because measurement errors usually have a normal distribution, system 105 may use normal distribution calculations to determine the statistical characteristics for these types of errors. In one embodiment, GR&R is defined based on the measurement range of the measurement device used to measure a feature or category part and represented as a percentage of the range. System 105 may calculate the measurement error from the measurement range and the gauge GR&R based on the following relationship:

$$\sigma = \Delta(GR\&R)/C, \text{ where}$$

$\Delta$ is the measurement range of the measuring device, $\sigma$ is the standard deviation of the measurement error, and C is a predetermined constant.

System 105 may measure parameters directly or calculate their values from one or more directly measured parameters. For example, system 105 may use the following error transfer function to determine an error of an indirectly measured parameter:

$$Y = F(Xi)$$

$$\sigma^2 = \Sigma((\delta F/\delta Xi)\sigma_{Xi})^2$$

where Y is an indirectly measured parameter, F(Xi) is the function of Y related to the directly measured parameter Xi, $\sigma_Y$ is the standard deviation of Y, and $\sigma_X$ is the standard deviation of Xi. To illustrate this embodiment further, consider a spring load component for the exemplary fuel injector where the spring assembly length is directly measured. Accordingly, the error in the spring load is calculated from the relationship between the spring load and its assembly length. For example, $$Fs = KX$$

$$\sigma^2_F = ((\delta F_s/\delta X)\sigma_X)^2 = (K\sigma X)^2$$

Generally, a product is built in accordance with a designed assembly procedure that is associated with the components of the product. Because the assembly procedure has an impact on the overall performance of the product, variations between components used to repeatedly assemble a number of similar products are taken into consideration by system 105. For example, if the values shift because the gauges used during assembly are improperly calibrated, the features associated with the assembly may be outside of the acceptable tolerances. Accordingly, in step 240, system determines assembly characteristic information associated with the manufacture of the product under analysis. In one embodiment of the analysis method, the assembly process includes two steps, the sub-assembly of components (using category parts) and final assembly (including all features).

To model the sub-assembly process, system 105 may receive designed nominal and tolerance window (e.g., upper and lower bounds) information for one or more category parts that are used to assemble the components of the product. System 105 may receive this information from one or more entities 140-1 to 140-N, such as an assembly department of the manufacturer of the product. Based on information relating to the assembly procedure of the components using the category parts, system 105 calculates an actual mean and variation standard deviation value for each category part. Because the features of the category parts included in the sub-assembly procedure may have a normal distribution, the mean value may shift from the designed nominal value if a measuring device (e.g., a gauge) involved in taking measurements during the sub-assembly procedure has offsets due to mis-calibration. Accordingly, if a feature of a category part is related to a measured variable, system 105 determines the mean value for the feature based on the following relationship:

$$\Delta Y = \sum_i ((\delta F/\delta X)\Delta Xi), \text{ where}$$

$\Delta Y$ is the mean value shift from the nominal designed value, $\Delta X$ is the gauge offset for variable X, and F is the function between the sub-assembly feature and measurement X.

System 105 may determine the function of Y and X based on the assembly procedure. To illustrate this embodiment, consider an exemplary a assembly procedure for exemplary fuel injector product. This exemplary assembly procedure may begin with measuring spool travel associated with a spool valve with respect to a reference body plate thickness to obtain a spool travel measurement $X_1$. Next, the reference body plate thickness for setting the measured spool travel is measured, which is labeled $X_2$. The difference between the measured spool travel and the designed nominal is then calculated using the relationship $X_1 - X_{Nominal}$. The required body plate thickness for setting the spool travel to nominal is determined using the relationship:

$$Y = X_2 + (X_1 + X_{Nominal}).$$

The category of the body plate based on Y is selected, and a spool valve is then assembled. Based on the above exemplary procedure, system 105 may determine the shift of the mean value for the spool travel from its nominal value if the measurement gauge has an offset of:

$$\Delta Y = \Delta X_1 + \Delta X_2.$$

The assembled mean value for the spool travel may then be determined by system 105 based on the relationship:

$$X = X_{Nominal} + \Delta Y.$$

The variation transfer through the assembly of the spool travel is determined based on the following relationship:

$$\sigma^2_Y = \Sigma((\delta F_s/\delta Xi)\sigma_{Xi})^2.$$

Based on the spool assembly procedure, system 105 may determine that there are three variations involved in the above exemplary sub-assembly process. These are the measurement variance of the body plate and spool travel and the variance of the body plate as a category part. Accordingly, system 105 may determine the variance of spool assembly based on the following relationship:

$$\sigma_Y = (\sigma^2_{Body.m} + \sigma^2_{Spool.m} + \sigma^2_{Body.C})^{1/2}, \text{ where}$$

$\sigma^2_{Body.m}$ is the measurement variance of the body plate, $\sigma^2_{Spool.m}$ is the measurement variance of the spool travel, and $\sigma^2_{Body.C}$ is the variance of the body plate as a category part.

Figure 5:
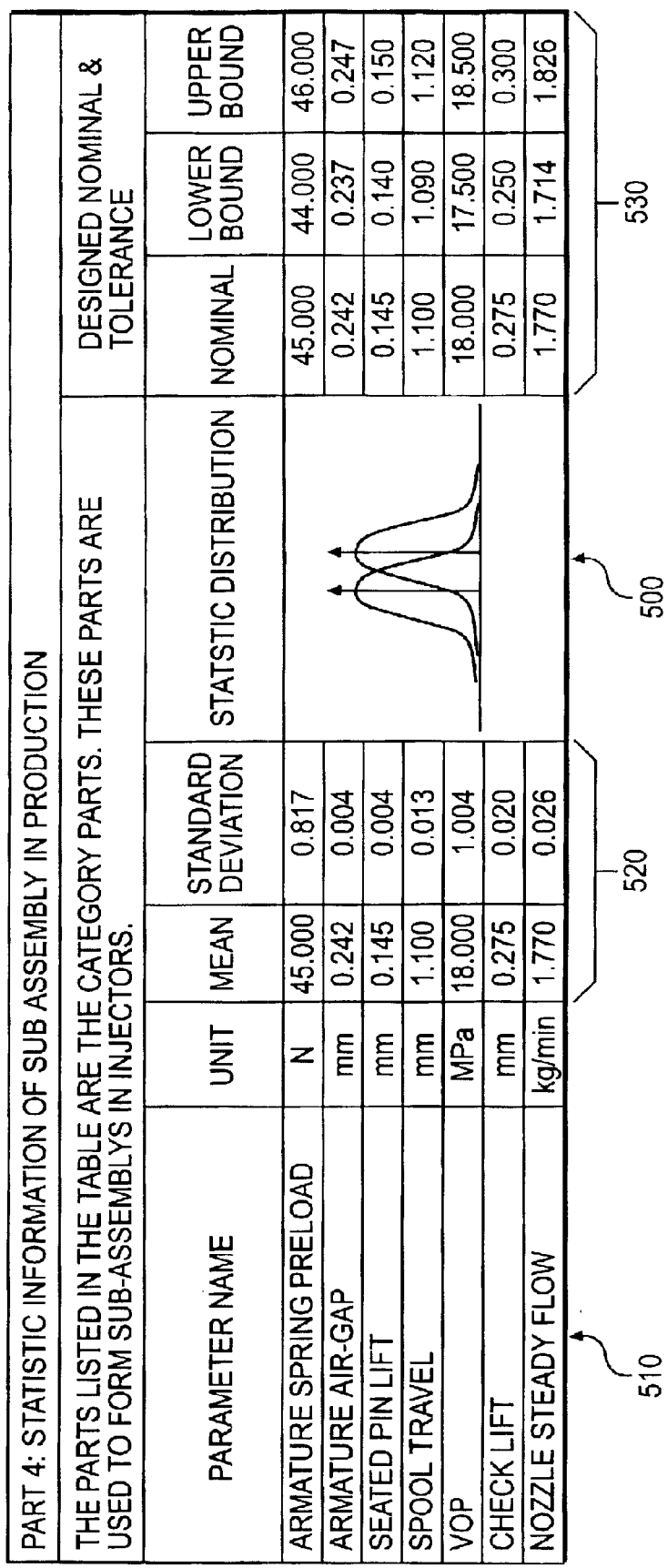
FIG. 5 illustrates an exemplary table of sub-assembly category parts consistent with embodiments of the present invention.

System 105 may also determine the standard deviation of the sub-assembly for each category part in a manner similar to the assembly procedure described above. FIG. 5 shows a table 500 listing exemplary features 510 for exemplary category parts involved in an exemplary sub-assembly process and their corresponding calculated (e.g., mean and standard deviation) and designed (e.g., nominal and tolerance window) values, 520 and 530, respectively.

Returning back to FIG. 2, system 105 may also determine a desired quality characteristic. For example, a desired quality characteristic may be FTP test criteria that is determined during the analysis method (step 250). The FTP test criteria may be based on the requirements or guidelines provided by, but not limited to, one or more customers or design groups, and may include a correlation between product performance and test criteria. System 105 may receive from an entity (e.g., entity 140-1) test criteria that includes values for one or more selected test points associated with the product under analysis. For example, in the above exemplary fuel injector product, a rated condition associated with the injector may be used as an FTP test criterion, such as rated delivery, timing, etc. To determine an error of a correlation between actual product performance and the FTP test criteria, system 105 may test a set of reference products to obtain performance information related to the selected FTP test criteria. For example, a number of the exemplary fuel injector products may be tested in a testing facility (e.g., test bench) to obtain reference data for the selected FTP test criteria (e.g., rated delivery, timing, etc.). System 105 may receive the results of these reference tests to determine the mean value of performance of the reference products. Further, system 105 may determine the standard deviation for each reference product's corresponding test criteria. The standard deviation represents the variation between reference values between tests (e.g., daily, weekly, etc.). Accordingly, large standard deviation values may indicate to system 105 that there is some instability in the FTP testing process.

As indicated above, system 105 may determine the test criteria based on one or more customer requirements. These requirements may include a nominal value for the selected FTP test criteria. System 105 determines whether there is proper correlation between the FTP test criteria and the product performance by comparing the determined mean values for the reference products and their corresponding nominal values associated with the FTP test criteria.

Figure 6:
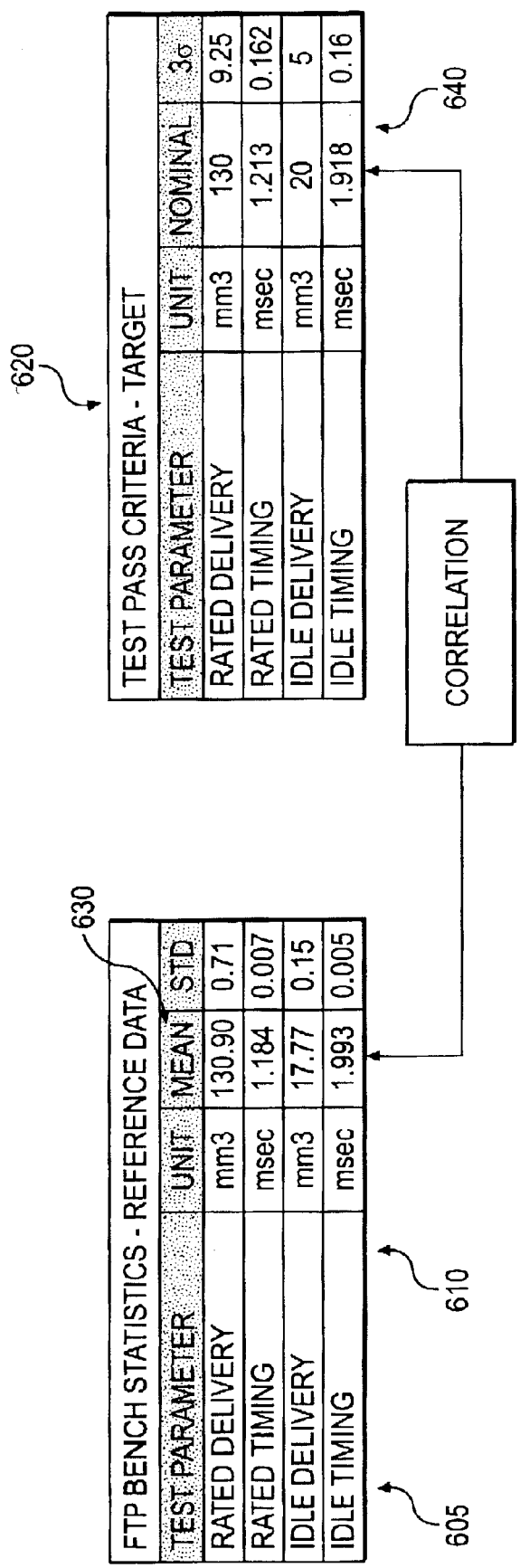
FIG. 6 illustrates an exemplary table of FTP reference test data and FTP test criteria consistent with embodiments of the present invention.

FIG. 6 shows an FTP reference test table 610 and an FTP test criteria table 620 associated with an exemplary fuel injector. As shown in the figure, the correlation between the mean value 630 and a nominal value 640 for each test criteria 605 determines whether the product (e.g., fuel injector) will have a FTP pass rate that is accurate. System 105 may determine, based on the correlation between these two values (e.g., mean and nominal values), whether the performance of the product is being evaluated correctly.

As described, steps 210–250 of the analysis process provide a correlation between information associated with the manufacturing, assembly, testing, and desired quality characteristics for a product. Based on this assembled information, system 105 may perform an FTP analysis and prediction process (step 260).

In one embodiment, system 105 may predict the performance variation of the assembly and manufacturing of a product based on a relationship between the features and the performance of the product. Accordingly, system 105 performs a sensitivity analysis to develop the relationship. To perform a sensitivity analysis, system 105 determines the characteristics associated with the product under analysis and develops a relationship function between the features identified in step 200 and the performance of the product. For example, a fuel injector product may include performance aspects of fuel delivery (Q) and injection timing (T). Accordingly, system 105 may develop the relationship between the injector's features and the performance based on the following functions:

$$Q=Q(Xi)$$

$$T=T(Xi).$$

System 105 may be configured to assume that the variable X changes in a small range of values. Therefore, the relationship between the performance variation with the variation of X may be determined as:

$$\Delta Q = \sum_i ((\delta Q / \delta Xi) \Delta Xi, \text{ and}$$

$$\Delta T = \sum_i ((\delta T / \delta Xi) \Delta Xi.$$

Based on the above relationships, system 105 may determine the gain factors (G) of variable X for the delivery and timing as:

$$G_{Q\_X}=(\delta Q/\delta Xi), \text{ and}$$

$$G_{T\_X}=(\delta T/\delta Xi).$$

The gain factors G for each performance aspect of the product may be determined from simulation or actual test processes. To determine the correlation between the performance aspects and features of the product, system 105 may determine the mean value and variation range based on the manufacturing and assembly information determined in steps 220 and 240 of the FTP analysis method. Therefore, for category parts of the product, the upper and lower bound of the variation range may be determined by system 105 based on the following relationships:

$$U\text{Bound\_}3\sigma=UT\_\text{Bound}+(\text{Nominal-Mean})/Cpk, \text{ and}$$

$$L\text{Bound\_}3\sigma=LT\_\text{Bound}-(\text{Nominal-Mean})/Cpk.$$

The above relationships take into account the effect of the shift of the mean value on the statistical distribution of the feature associated with the category part. System 105 may determine the upper and lower bound of the variation range for sub-assembly features using a different relationship, defined as:

$$U\text{Bound\_}3\sigma=3\sigma, \text{ and}$$

$$L\text{Bound\_}3\sigma=3\sigma.$$

FIG. 7 shows a table 700 listing exemplary statistical production information 710 and gain factors 720, 730 for the delivery and timing performance aspects of an exemplary fuel injector product. As shown, the gain factors 720 and 730 include values for two test points, rated 740 and idle 750 conditions. A product under analysis may include additional or fewer test points associated with the performance aspects of the product. Accordingly, system 105 determines the gain factors for each test point associated with the product's performance.

To obtain accurate gain factors, system 105 correlates the simulation model of the product to reflect variations of the product. In one embodiment, system 105 correlates the statistical distribution of performance of the product with the statistical distribution of its features.

Figure 8:
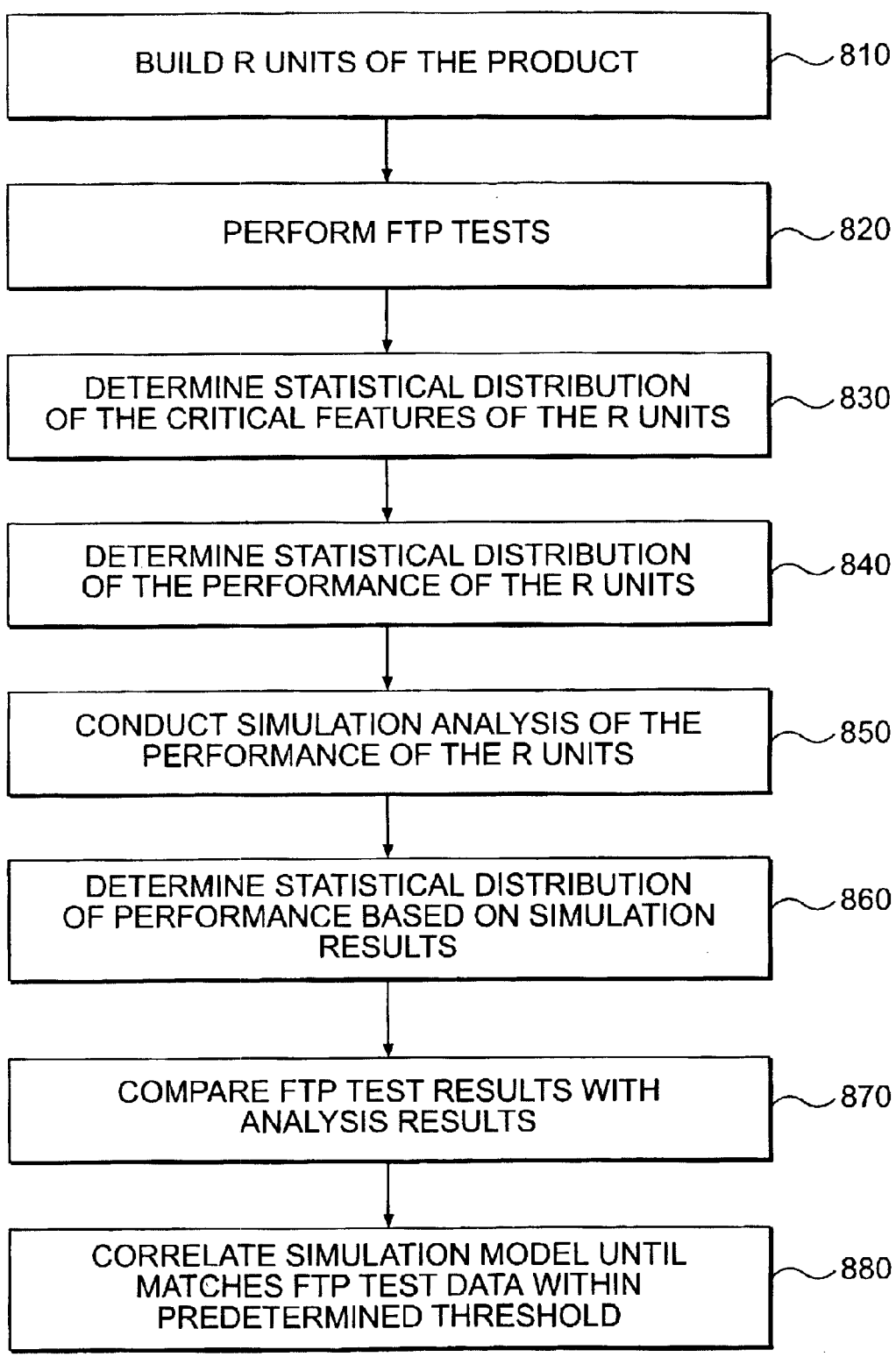
FIG. 8 illustrates a flowchart of an exemplary gain factor process consistent with embodiments of the present invention.

FIG. 8 shows a gain factor process that may be performed to obtain accurate gain factors for a product. As shown, the gain factor process begins with a manufacturer building R units (e.g., 31 units) of a product and providing complete documentation of its features (Step 810). Next, FTP tests in an FTP test environment (e.g., FTP test bench) are performed on the R units to obtain performance information associated with one or more FTP test points for the product (step 820). The statistical distributions of the features for building the R units is then determined (step 830). Also, the statistical distribution of the performance of the R units at the FTP test points is determined (step 840). Manufacturing and assembly information associated with the R units is used by system 105 to conduct a simulation analysis of the performance at the FTP test points (step 850). Based on results from the simulation analysis, system 105 may determine the statistical distribution of performance for the product (step 860). System 105 may compare the statistical characteristics of the simulation analysis results with the FTP test results (step 870), and based on the comparison, correlates the simulation model until it matches the FTP test data within a predetermined threshold value (e.g., within a range of values) (step 880).

Once system 105 determines the gain factors for the product's performance aspects, the performance variation is determined using the following relationships:

$$\Delta Qi = G_{Q\_Xi} \Delta Xi, \text{ and}$$

$$\Delta Ti = G_{T\_Xi} \Delta Xi.$$

To simplify the processing involved with determining the above exemplary gain factors, this embodiment may assume that there is no interaction between the factors. However, in instances where such a relationship may exist, system 105 may be configured to determine the relationships between the features of the product. Further, the features may be independent of each other. Accordingly, their variation may be considered small enough that system 105 may apply linear approximation techniques to calculate the features' effect on the performance of the product. Alternatively, the features may have some dependency on each other. Accordingly, system 105 may be configured to apply Design of Experiment techniques (e.g., Taguchi method) to obtain a relationship between the features. The variation of the features may be converted into a variation of performance of the product using performance variation relationships ΔQi and ΔTi. FIG. 9 shows a table 900 listing exemplary performance variation information for the exemplary fuel injector. As shown, table 900 includes two performance variation parts, the mean performance shift 910 reflecting the mean value shift from the nominal value of each feature and the upper and lower 3 standard deviation 920 and 930, respectively, reflecting the variation of the feature.

In one embodiment, system 105 may determine the mean performance shift based on the shift of the feature and the gain factor of the feature for each of the performance aspects of the product. For example, considering the exemplary fuel injector product, the delivery and timing performance aspects result in the following relationships:

$$\Delta Qi = G_{Q\_Xi} \Delta Xi, \text{ and}$$

$$\Delta Ti = G_{T\_Xi} \Delta Xi.$$

System 105 may then determine the overall shift mean performance based on the following relationships:

$$\Delta Q = \sum_i \Delta Qi, \text{ and}$$

$$\Delta T = \sum_i \Delta Ti.$$

Further, system 105 may determine the overall effects of the features from the following statistical summations:

$$U3\sigma = [\Sigma \text{Max}(\text{Upper\_3Sigma}, \text{Lower\_3Sigma})^2]^{1/2}$$

$$L3\sigma = [\Sigma \text{Min}(\text{Upper\_3Sigma}, \text{Lower\_3Sigma})^2]^{1/2}$$

System 105 may be configured to assume that the performance distribution in the above statistical summations are equivalent to a normal distribution on both sides of the mean value. However, system 105 may also determine that the standard deviation on each side of the mean value may not be the same. That is, while 50% of a performance distribution curve may be on the lower side of the mean performance value and the other 50% will be on the upper side of the mean performance value, the standard deviation on each side of the mean performance may be different.

Figure 10:
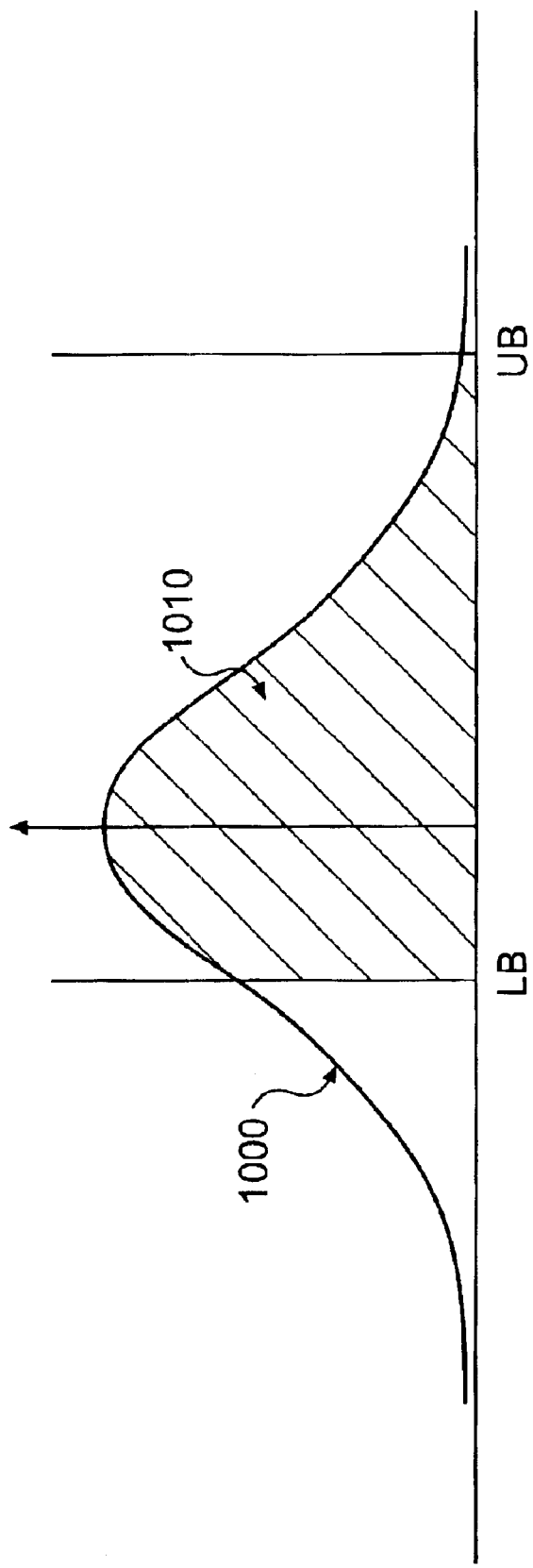
FIG. 10 illustrates an exemplary diagram of a distribution curve within a criteria window consistent with embodiments of the present invention.

In addition to FTP pass rate analysis, system 105 may predict the FTP pass rate by comparing the FTP criteria window with the product performance distribution. FIG. 10 shows an exemplary product performance distribution curve 1000 bounded by an FTP criteria window (e.g., LB and UB). As can be seen, only a portion 1010 of the distribution curve falls within the criteria window.

Based on the normalized distribution function, system 105 may determine a probability that the performance of the product falls into the FTP criteria window using the following relationship:

$$FTP_j = \int_{LB}^{UB} f(x)dx, \text{ where}$$

$f(x)$ is the nominal distribution function, j is the FTP test criteria, LB is the normalized lower bound of the FTP window, and UB is the normalized upper bound of the FTP window.

System 105 may determine the overall pass rate as the cumulative FTP pass rate determined above:

$$FTP = \prod_j FTP_j$$

System 105 may be configured to provide the predicted overall pass rate as a percentage value to an input/output device (not shown) for analysis by external entities, such as a user, or other computing systems (e.g., entity 140-1).

Industrial Applicability

The analysis method described above provides a way to consider and alter many of the factors contributing to the success (and failure) of manufactured components. In particular, the manufacturing and measuring capabilities for a product are accounted for by an analysis system, as are the assembly procedures. Because the analysis system can determine which features are the most sensitive (or have the most significant impact on the performance), these features can be more closely controlled and monitored. The desired quality characteristics, such as FTP test criteria, can be easily correlated with product performance. The analysis process described above permits the integration of some or all of the above described factors in a single method. As such, it is possible to determine not only how likely it is for a product to fail (based on the FTP pass rate), but also where it is most likely to fail (e.g., certain components). The components can be identified and improvement may be realized by changing the manufacturing, improving the assembly, and/or modifying the design, as relates to those components. The method also provides the basis for an economic model to assess cost and benefits associated with various design and manufacturing scenarios.

Although the above discussion focused on an exemplary fuel injector, it should be understood that any part, component, and/or product in manufacture could be analyzed using embodiments of the present invention. Further, although certain steps and/or sub-steps of the analysis process involve the intervention of a human operator, these interventions may also be performed automatically through simulation or through access of a knowledge management system known in the art.

It will be readily apparent to those skilled in this art that obvious changes and modifications may be made to the described system and methods, and all such changes and modifications are considered to fall within the scope of the appended claims. For example, system 105 may be configured to predict a change in the FTP pass rate based on a change in production times. For instance, failed units of a product may not be reworked, but rather taken apart. The disassembled components of the product may be reused to build new units. Accordingly, if failure of units is partially caused by defective components, these defective components may cause further damage when they are recycled into a production line. Accumulation of the defective parts through a manufacturing process life cycle may cause lower FTP pass rates. Accordingly, system 105 determines that the falling rate of the FTP pass rate based on defective components is related to the number of defective components and the inventory of components in a production line. Based on this correlation, system 105 may predict the variations of an FTP pass rate based on production time.

Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of predicting a quality characteristic of a product to be manufactured, comprising the steps of:
   integrating one or more of feature and tolerance information associated with the product, manufacturing characteristic information associated with a manufacture of the product, measurement characteristic information associated with the manufacture of the product, assembly characteristic information associated with an assembly of the product, and desired quality characteristic information associated with the product; and
   predicting the quality characteristic of the product based on the integrated information.

2. A method for predicting a quality characteristic of a product to be manufactured, comprising the steps of:
   identifying a feature and a corresponding tolerance associated with the product;
   determining a manufacturing characteristic associated with a manufacture of the product;
   determining a measurement characteristic associated with the manufacture of the product;
   determining an assembly characteristic associated with the assembly of the product;
   determining a desired quality characteristic associated with the product; and
   predicting the quality characteristic of the product based on the identified feature and associated tolerance, the determined manufacturing and measuring characteristics, the determined assembly information, and the desired quality characteristic.

3. The method of claim 2, wherein the step of identifying a feature includes:
   simulating the product to determine one or more features that affect a desired performance of the product.

4. The method of claim 3, further including:
   performing a sensitivity analysis to assess the impact of the one or more features on the desired performance.

5. The method of claim 2, wherein the manufacturing characteristic is indicative of a quality characteristic of the manufactured process.

6. The method of claim 2, wherein the desired quality characteristic is a first test pass (FTP) criteria.

7. The method of claim 2, wherein the step of determining a manufacturing characteristic includes:
   calculating a Cpk value reflecting a relationship between a manufacturing range of values and a tolerance range of values associated with the product.

8. The method of claim 2, wherein the step of determining a measuring characteristic includes:
   determining a gauge characteristic that is associated with a measuring device used during the manufacture of the product.

9. The method of claim 8, wherein the gauge characteristic is at least one of a repeatability and reproducibility value and a gauge offset value.

10. The method of claim 2, wherein the desired quality characteristic reflects a performance requirement associated with the product.

11. The method of claim 10, wherein the performance requirement is provided by a customer associated with the product.

12. The method of claim 2, wherein the step of predicting the quality of the product includes the steps of:
   determining a gain factor for each of one or more performance aspects associated with the product based on a relationship between the feature and a desired performance of the product;
   determining performance variation using the established gain factors; and
   analyzing the effect of the feature on the performance of the product based on the determined performance variation.

13. The method of claim 12, further including:
   determining a performance distribution based on the analyzed effect of the feature; and
   comparing the performance distribution to the desired quality characteristic.

14. The method of claim 2, wherein at least one of the identifying the feature and corresponding tolerance, determining the manufacturing characteristic, determining the measurement characteristic, determining the assembly characteristic, and determining the desired quality characteristic are performed automatically.

15. The method of claim 2, further including:
   altering at least one of the identified feature and corresponding tolerance, the determined manufacturing or measuring characteristics, the determined assembly characteristic, and the determined desired quality characteristic; and predicting the quality of the product based on the at least one of altered identified feature and corresponding tolerance, the determined manufacturing and measuring characteristics, the determined assembly characteristic, or the determined desired quality characteristic.

16. The method of claim 2, wherein predicting the quality characteristic of the product includes predicting a variation in a first test pass (FTP) rate associated with the quality of the product based on a production time of the product.

17. The method of claim 2, wherein predicting the quality characteristic of the product includes:
  determining a first test pass (FTP) rate value for the product based on the identified feature and corresponding tolerance, the determined manufacturing and measuring characteristics, the determined assembly characteristic, and the determined desired quality characteristic.

18. The method of claim 2, further including:
  determining category parts associated with the product, wherein the category parts, when assembled, form an assembly feature of the product.

19. The method of claim 18, wherein the assembly feature is associated with a spatial distance between one or more assembled category parts in the product.

20. A system for predicting a quality characteristic of a product to be manufactured, comprising:
  a memory including:
    instructions for identifying a feature and a corresponding tolerance associated with the product;
    instructions for determining a manufacturing characteristic associated with a manufacture process of the product;
    instructions for determining a measurement characteristic associated with the manufacture of the product;
    instructions for determining an assembly characteristic associated with the assembly of the product;
    instructions for determining a desired quality characteristic associated with the product; and
    instructions for predicting the quality characteristic of the product based on the identified feature and associated tolerance, the determined manufacturing and measuring characteristics, the determined assembly characteristic, and the determined desired quality characteristic; and
  a processor configured to execute each of the instructions included in the memory.

21. A computer-readable medium including instructions for performing a method, when executed by a processor, for predicting a quality characteristic of a product to be manufactured, the method comprising:
  identifying a feature and a corresponding tolerance associated with the product;
  determining a manufacturing characteristic associated with a manufacture of the product;
  determining a measurement characteristic associated with the manufacture of the product;
  determining an assembly characteristic associated with the assembly of the product;
  determining a desired quality characteristic associated with the product; and
  predicting the quality characteristic of the product based on the identified feature and associated tolerance, the determined manufacturing and measuring characteristics, the determined assembly information, and the desired quality characteristic.

* * * * *